(12) United States Patent
Vlasov et al.

(10) Patent No.: US 10,819,115 B2
(45) Date of Patent: Oct. 27, 2020

(54) MODULAR POWER SUPPLY SYSTEM

(71) Applicant: LIMITED LIABILITY COMPANY "WATTS BATTERY" [RU/RU], Moscow (RU)

(72) Inventors: Iurii Vladimirovich Vlasov, Moscow (RU); Mikhail Dmitrievich Dokuchaev, Moscow (RU); Vasilii Ivanovich Vinogradov, Moscow (RU); Alexandr Ivanovich Varenik, Moscow (RU)

( * ) Notice: Subject to any disclaimer, the term of this patent is extended or adjusted under 35 U.S.C. 154(b) by 0 days.

(21) Appl. No.: 16/636,917

(22) PCT Filed: Jan. 26, 2018

(86) PCT No.: PCT/RU2018/000041
§ 371 (c)(1),
(2) Date: Feb. 6, 2020

(87) PCT Pub. No.: WO2019/147156
PCT Pub. Date: Aug. 1, 2019

(65) Prior Publication Data
US 2020/0169091 A1    May 28, 2020

(30) Foreign Application Priority Data

Jan. 24, 2018 (RU) .................. 2017135083

(51) Int. Cl.
*H02J 3/38* (2006.01)
*H02J 13/00* (2006.01)
(Continued)

(52) U.S. Cl.
CPC .............. *H02J 3/381* (2013.01); *H02J 3/32* (2013.01); *H02J 7/35* (2013.01); *H02J 9/06* (2013.01);
(Continued)

(58) Field of Classification Search
CPC ...... H02J 3/32; H02J 3/381; H02J 7/35; H02J 9/06; H02J 13/00026; H02J 2300/24
(Continued)

(56) References Cited

U.S. PATENT DOCUMENTS

| | | |
|---|---|---|
| 8,575,780 B2 | 11/2013 | Moon |
| 2011/0175451 A1 | 7/2011 | Moon |
| 2013/0154569 A1 | 6/2013 | Endo et al. |

FOREIGN PATENT DOCUMENTS

RU      2524355 C1    7/2014

*Primary Examiner* — Hal Kaplan
(74) *Attorney, Agent, or Firm* — Dmitry S. Kryndushkin, IP Center Skolkovo

(57) ABSTRACT

The claimed system relates to electrical equipment and comprises a module that includes a module docking unit (16), a remote control device (1), electrical connectors (2, 3) for connection to sources of alternating current (AC) and direct current (DC), and electrical connectors (4, 5) for connection to an AC load and to a DC load. The electrical connector (2) for connection to an AC source is connected, via a unit (6) for switching a supply of electrical energy from an AC source, to the electrical connectors (4) for connection to an AC load and to an AC/DC converter (7), and the electrical connector (3) for connection to a DC source is connected, via a unit (8) for selecting a maximum output from solar panels and a unit (9) for determining a drop in voltage from the DC source, which are connected in series, and by a storage battery charging unit (10), to a first DC converter (11) which steps up and stabilizes the voltage. The storage battery charging unit (10) is connected, via a battery management system unit (12), to a storage battery unit (13) connected to the first DC converter (11), the latter being connected to the electrical connectors (4) for connection to an AC load via an inverter (14) having the function of switching off the supply of DC electrical energy thereto, and to the electrical connectors (5) for connection to a DC load
(Continued)

via a second DC converter (15) which steps down the voltage. The invention allows more stable and reliable functioning of the power supply system and could be used as independent power supply system with combination of photovoltaic panels.

3 Claims, 1 Drawing Sheet

(51) Int. Cl.
- *H02J 3/32* (2006.01)
- *H02J 7/35* (2006.01)
- *H02J 9/06* (2006.01)

(52) U.S. Cl.
CPC ..... *H02J 13/00026* (2020.01); *H02J 2300/24* (2020.01)

(58) Field of Classification Search
USPC .......................................................... 307/22
See application file for complete search history.

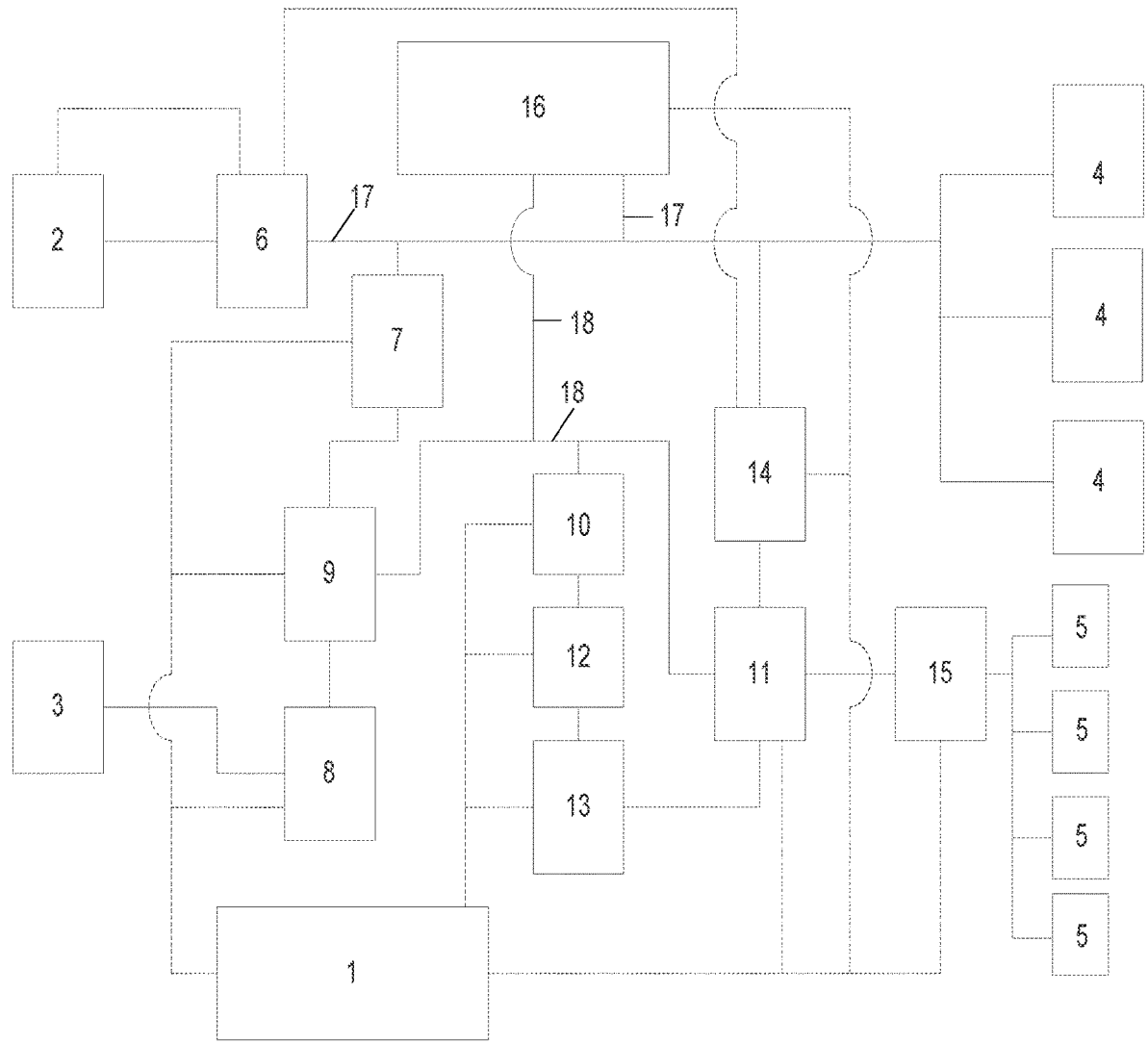

MODULAR POWER SUPPLY SYSTEM

FIELD OF THE INVENTION

The invention relates to electrical equipment, in particular to a modular power supply system, designed to provide power to objects using the built-in electricity conversion and storage system of the direct and alternating current power sources, such as photovoltaic panels and elements, wind generators, fuel generators, an alternating current grid. The system has an integrated telecommunications module that provides remote control and monitoring. In addition, any of the system modules can be used as a portable alternating current power source.

BACKGROUND OF THE INVENTION

There is the prior art power storage apparatus disclosed in the U.S. Pat. No. 8,575,780 B2, published May 11, 2013 The prior art power storage apparatus comprises a power conversion unit connected between the first node and a power generation system, a battery management system (BMS), a bi-directional converter connected between the BMS and the first node, a bi-directional inverter connected between the first node and the second node, a grid connector for connecting the power grid to the second node, a battery and an integrated controller.

The disadvantage of the prior art power storage apparatus is low reliability of operation.

In addition, there is the prior art uninterruptible power supply system that disclosed in RU 2524355 C1, published 27 Jul. 2014, prototype The uninterruptible power supply system comprises one rechargeable battery at least, a consumer power supply system, a control unit, a battery charge system including a charger unit. Wherein the battery charging system includes additionally a direct current switching unit, connected through a converter unit and the charger one with the battery. Besides this, the battery charging system includes additionally an alternating current switching unit, connected through the charger unit with the battery; the consumer power supply system consists of a direct current load switching unit connected through the converter unit with the battery; the consumer power supply system includes additionally the alternating current load switching unit connected through an inverter unit with the battery. Further, the alternating current will be denoted as AC, and the direct current as DC.

The disadvantage of the uninterrupted power supply system is low reliability of operation.

SUMMARY OF THE INVENTION

The objective of the claimed invention is to develop the modular power supply system in order to ensure a stable power supply with the system remote control and monitoring.

The technical result of the invention is to improve the stability and reliability of the modular power supply system operation, including through a uniform technologically executed constructive solution.

The said technical result is achieved due to the fact that the modular power supply system includes at least one module comprising a module docking unit, a remote control device, a connector for plugging the AC source made in the form of an electrical grid or a generator, and a connector for plugging the DC source made in the form of solar panels, connectors for plugging to the AC load made in the form of the power connector and two sockets, and connectors for plugging to the DC load made in the form of four USB or similar outputs. Wherein the connector for plugging the AC source through the AC power supply switching unit is connected with the AC load connectors and the AC/DC converter having the function of breaking the AC power supply to it, and the connector for plugging the DC source through the solar battery maximum power selection unit and the DC source voltage drop detection unit serially linked is connected with the battery charging unit and the first DC converter, raising and stabilizing voltage with the function of shutting off the DC power supply to it. Wherein, the battery charging unit is connected through the BMS unit to the battery unit, that linked with the first DC converter, and the first DC converter joined through the inverter to the AC load connectors and to the DC load connectors through the second DC converter decreasing voltage.

The module is equipped with a WI-Fi module, a Bluetooth module and a GSM module.

The remote control device comprises an activation button with a scale indicating the capacity of the battery unit and an indicator panel on the module body.

BRIEF DESCRIPTION OF THE DRAWINGS

It will be easier to understand the essence of the invention from the description, which is not restrictive and is given with the reference to the attached drawings where the following figures are depicted:

FIG. 1—Module structure diagram

1—remote control device; 2—AC source connector; 3—DC source connector; 4—AC load connectors; 5—DC load connectors; 6—AC power supply switching unit; 7—AC/DC converter; 8—solar battery maximum power selection unit; 9—DC source voltage drop detection unit; 10—battery charging unit; 11—first DC converter; 12—BMS unit; 13—battery unit; 14—invertor; 15—second DC converter; 16—Module docking unit; 17—AC electric bus; 18—DC electric bus.

DETAILED DESCRIPTION OF THE INVENTION

The modular power supply system comprises at least one module comprising a module docking unit (16), a remote control device (1), a connector (2) for plugging the AC source made in the form of an electrical grid or a generator, and a connector (3) for plugging the DC source made in the form of solar panels, three connectors (4) for plugging to the AC that are one power connector and two sockets, and four connectors (5) for plugging to the DC load made in the form of four USB or similar outputs. Wherein the connector (2) for plugging the AC source through the AC power supply switching unit (6) is connected with the AC load connectors (4) and the AC/DC converter (7) having the function of breaking the AC power supply to it, and the connector (3) for plugging the DC source through the solar battery maximum power selection unit (8) and the DC source voltage drop detection unit (9) serially linked is connected with the battery charging unit (10) and the first DC converter (11), raising and stabilizing voltage with the function of shutting off the DC power supply to it. Wherein the battery charging unit (10) is connected through the BMS unit (12) to the battery unit (13), that linked with the first DC converter (11), and the first DC converter (11) joined through the inverter

(14) to the AC load connectors (4) and to the DC load connectors (5) through the second DC converter (15) decreasing voltage.

The module is equipped with a WI-Fi module, a Bluetooth module and a GSM module.

The remote control device (1) comprises an activation button with a scale indicating the capacity of the battery unit (13) and an indicator panel on the module body.

The modular power supply system is turned on/off using the activation button, or using the command sent to the remote control device (1) using a mobile device or computer via the Wi-Fi module, Bluetooth module or GSM module.

The claimed modular power supply system works as follows.

The modular power supply system comprising one module is connected with a wire intended for connecting the solar panels via the connector (3), the connector type (3) is a two-pole terminal connector for connecting a DC source. In addition, the module is connected with a wire (wire type when connected to the home network is standard cable type for connection to the socket, wire type when connected to the electric cabinet is power cable with copper conductors;) to the electrical grid, or to the generator that generates electrical power (for example, a wind generator, a diesel generator, etc.) through the connector (2) (the type of connector when connected to the home network is a standard cable for connection to the socket; the type of connector when connected to the electric cabinet is a three-pole terminal connector). If it is necessary to generate a high power by the modular power supply system, an additional module is installed on top of the module, wherein the modules are connected using the module docking unit (16) located in each module, and the module docking unit (16) is electrically connected to the AC electrical buses (17) and DC (18) ones, which electrically connect all units in each module. Wherein, the module docking unit (16) consists of connectors located on the top and bottom of each module, allowing to connect modules located one above the other. For the connection of modules, high-voltage switching connectors are used, as well as low-voltage communication contacts based on spring connectors. A modular system can comprise a number of modules located one above the other, each of them has a given output power, wherein the modular system multiplies the output power in proportion to the number of modules. The unit (13) of the modular system can have the following dimensions: length×height×width=460×110×360 mm, which includes lithium-ion batteries.

The claimed modular system has several modes of operation.

The Mode of AC Generation from Solar Panels.

The solar energy from the DC source connector (3) via the DC electrical bus (18) enters the solar battery maximum power selection unit (8) with the function of searching for the maximum power point of the solar panel, in which solar energy is converted into DC electrical power, after which the converted electrical power through the DC source voltage drop detection unit (9) arrives at the first DC converter (11) of the current module. Wherein if the battery unit (13) is not fully charged, then DC electric power is also supplied to the battery charging unit (10) of the current module. Also, the DC electrical power with the DC electric bus (18) through the module docking unit (16) is fed to the first DC converter (11) of other modules and to the battery charging unit (10) of other modules. From the battery charging unit (10), equipped with a voltage switching board, the DC electric power is supplied through the BMS unit to the battery unit (13) to charge them. Stabilization and increase in the DC electric power voltage takes place in the first DC converter (11), after which the DC electric power enters the inverter (14) and the second (15) DC converter. In the inverter (14), the DC electric power is converted into AC electric power, which is fed via the AC electrical bus (17) to the AC load connectors (4), to which the AC electrical power consumers are connected. In the second inverter (15), the DC electric power is decreased, then it comes via the DC electrical bus (18) to the DC load connectors (5), to which the DC electrical power consumers are connected. In this mode, the AC power supply switching unit (6) is turned off, which makes it possible not to supply electrical power from the AC source to the modular system. The AC power supply switching unit (6) is controlled by the remote control device (1), which is controlled by a mobile device or computer via a Wi-Fi module, a Bluetooth module or a GSM module. This mode is activated due to the fact that the remote control device (1) sends a command to the AC power supply switching unit (6), which turns off the supply of AC electrical power into the modular system.

The Mode of Charging Batteries from Solar Panels without Generating AC.

This mode is similar to the previous one, except that the converted electrical power through the DC source voltage drop detection unit (9) enters only the unit (10) for charging the batteries of the current module to charge then the batteries and via the DC electric bus (18) through module docking unit (16) to the battery charging unit (10) of another module. This mode is activated due to the fact that the remote control device (1) sends a command to the unit (9), which turns off the supply of DC electric power to the first (11) DC converter.

The Mode of Simultaneous Generation of AC from Solar Panels and from the Electrical Grid.

This mode is similar to the mode of generation AC from solar panels, except supplying AC electrical power additionally through the AC source connector (2). This mode of operation is carried out in case of a lack of power from solar panels. The required power level is determined by the DC source voltage drop detection unit (9). When determining the voltage reduction, that supplied from the DC source, by the DC source voltage drop detection unit (9), the remote control device (1) sends a command to the AC power supply switching unit (6) to switch to the AC/DC converter (7) to turn on AC source power supply through them, wherein additional AC source electric power (electrical grid) from the AC source connector (2) via the AC electric bus (17) enters the AC/DC converter (7), after which the converted electrical power through the DC source voltage drop detection unit (9) goes to the battery charging unit (10). Further, the operation of the device is carried out according to the mode of AC generation from solar batteries as disclosed above. This mode is activated due to the fact that the remote control device (1) gives a command to the unit (9), which turns on the AC/DC converter, into which the AC power is supplied.

The Mode of the AC Bypass.

This mode is activated in case of any problems in the apparatus, or the batteries in the battery unit (13) are discharged, or switched manually/automatically by unit energy management system. This mode is activated due to the fact that the remote control device (1) sends a command to the unit (9), which turns off the converter (7) and the inverter (14). In this mode, the AC electrical power from the AC source connector (2) using the AC electrical bus (17) through the AC power supply switching unit (6) enters the AC load connectors (4) in the module, and also via the AC electrical bus (17) through the module docking unit (16), the electrical power comes to the AC load connectors (4) of the above located modules.

Network-Inverter Mode.

This mode is activated by connecting the supply of the AC electric power, that are generated by the inverter (14) and connected to the AC power supply switching unit (6), from/to the AC source to the AC load connectors (4). In the mode, the solar energy from the DC source connector (3) via the DC electrical bus (18) enters the solar battery maximum power selection unit (8) with the function of searching for the maximum power point of the solar panel, after which the converted electrical power through the DC source voltage drop detection unit (9) or the DC electric power from the battery unit (13) arrives at the first DC converter (11), in which the stabilization and increase of the voltage of the DC electric power occurs, after that the DC electric power enters the inverter (14). In the inverter (14), the DC electric power is converted into AC electrical power, which is then supplied via the AC electrical bus (17) to the AC power supply switching unit (6).

Thus, the claimed invention allows to increase the stability and reliability of the modular energy supply system operation due to the claimed design of the modular system, which ensures the operation of the device in various modes, as well as the availability of the bypass system, which allows to increase the reliability and stability of the apparatus operation in emergency situations and situations that do not require producing AC from batteries.

The invention has been disclosed above with reference to a specific embodiment. Other embodiments of the invention may be obvious to those skilled in the art, which do not change its essence, as disclosed in the present description. Accordingly, the invention should be considered limited in scope only by the following claims.

The invention claimed is:

1. A modular power supply system comprising at least one module comprising a module docking unit, a remote control device, a connector for plugging an alternating current source made in a form of an electrical grid or a generator, and a connector for plugging a direct current source made as solar panels, connectors for plugging to an alternating current load made as a power connector and two sockets, and connectors for plugging to a direct current load made as four USB or similar outputs, wherein the connector for plugging an alternating current source through an alternating current power supply switching unit is connected with the alternating current load connectors and a converter of alternating current to direct current, and wherein the connector for plugging a direct current source through series-connected solar battery maximum power selection unit and direct current source voltage drop detection unit is connected with a battery charging unit and a first direct current converter, raising and stabilizing voltage, wherein the battery charging unit is connected through a BMS unit to a battery unit that linked with the first direct current converter, and the first direct current converter is linked to the alternating current load connectors through an inverter with a function of shutting off direct current power supply to itself and linked to the direct current load connectors through a second direct current converter, decreasing voltage, wherein above said connectors and units are connected to each other using appropriate alternating current and direct current electrical buses.

2. The modular power supply system according to claim 1, wherein the module is equipped with a Wi-Fi module, a Bluetooth module and a GSM module.

3. The modular power supply system according to claim 1, wherein the remote control device comprises an activation button with a scale indicating capacity of the battery unit and an indicator panel on a module body.

* * * * *